(12) United States Patent
Fyhr

(10) Patent No.: US 7,712,194 B2
(45) Date of Patent: May 11, 2010

(54) BELT LATCH FOR A SAFETY BELT

(75) Inventor: Fredrik Fyhr, Vargarda (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/278,496

(22) PCT Filed: Feb. 1, 2007

(86) PCT No.: PCT/EP2007/000843

§ 371 (c)(1),
(2), (4) Date: Aug. 6, 2008

(87) PCT Pub. No.: WO2007/090551

PCT Pub. Date: Aug. 16, 2007

(65) Prior Publication Data

US 2009/0025193 A1   Jan. 29, 2009

(30) Foreign Application Priority Data

Feb. 9, 2006   (DE) .................. 10 2006 005 886

(51) Int. Cl.
*A44B 11/10*   (2006.01)
*A44B 11/26*   (2006.01)

(52) U.S. Cl. .................. 24/171; 24/194; 24/265 BC

(58) Field of Classification Search .................. 24/171, 24/193, 196, 194; 280/801.1, 806
See application file for complete search history.

(56) References Cited

U.S. PATENT DOCUMENTS

| 4,876,770 | A |   | 10/1989 | Bougher |
| 5,806,148 | A | * | 9/1998 | McFalls et al. .................. 24/168 |
| 5,879,816 | A |   | 3/1999 | Mori et al. |

FOREIGN PATENT DOCUMENTS

DE   19822 473 A1   3/1999

* cited by examiner

*Primary Examiner*—James R Brittain
(74) *Attorney, Agent, or Firm*—Brinks Hofer Gilson & Lione

(57) ABSTRACT

A belt tongue for a safety belt having a connecting plate for connecting the belt tongue with a buckle, a tongue main body being rigidly connected to the belt tongue and a clamping element with a bending edge. The clamping element is mounted in the tongue main body in such a way that it rotates in relation to the tongue main body if the force in the belt exceeds a defined force. The clamping element forms a concave outer surface. In order to be able to achieve a low weight of the belt tongue and in particular of the bending element, the clamping element is supported on the tongue main body by means of its outer surface.

9 Claims, 3 Drawing Sheets

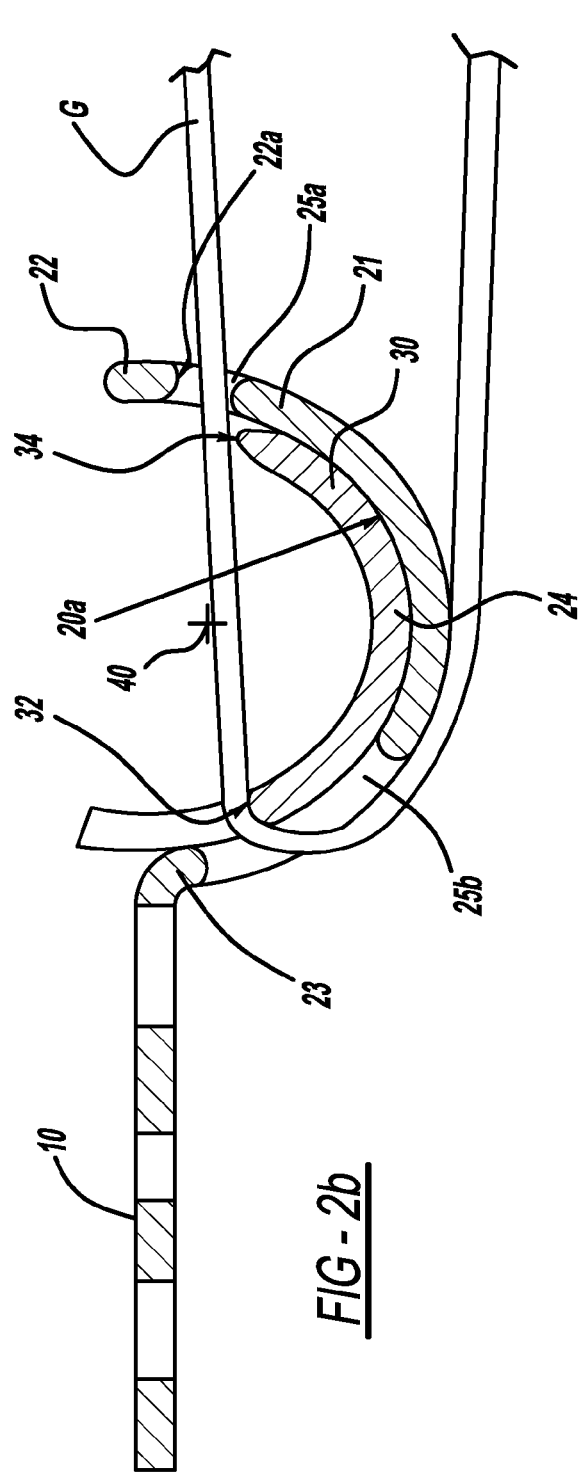
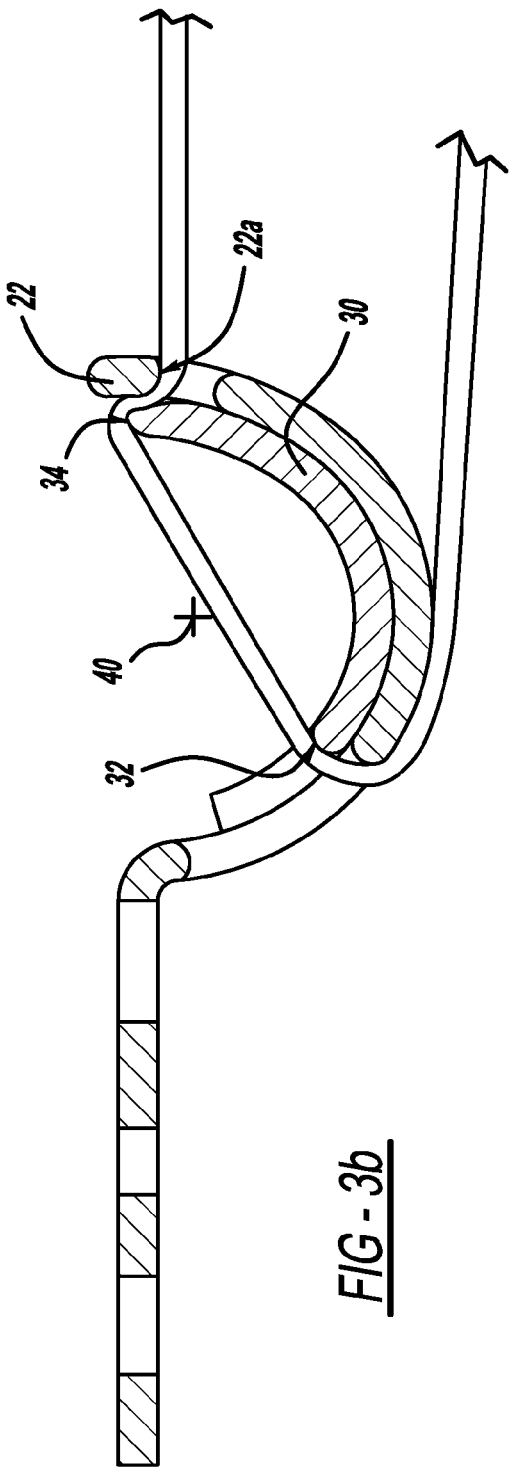

BELT LATCH FOR A SAFETY BELT

CROSS REFERENCE TO RELATED APPLICATIONS

This application claims priority to German patent application number 10 2006 005 886.0, filed Feb. 9, 2006 and PCT/EP2007/000843, filed Feb. 1, 2007.

FIELD OF THE INVENTION

The invention relates to a belt tongue for a motor vehicle safety belt system.

BACKGROUND OF THE INVENTION

In a three-point safety belt system, the belt extends from a top to a bottom point. A belt tongue, which can be connected with a belt buckle and divides the belt webbing into a lap belt section and an upper body or shoulder belt section, is located on the belt webbing. For this purpose, the belt tongue forms a tongue main body with an eye, through which the belt webbing runs.

It has become clear that in case of an accident, it can be advantageous to separate the lap belt section of the belt webbing from the shoulder belt section, i.e. to block the belt webbing in the tongue main body of the tongue.

In this connection, generic patent DE 198 22 473 C2 proposes a belt tongue in whose tongue main body has a bending and clamping element arranged so as to be rotatable around an axis. In a load-free condition this clamping element is in a first position, in which the belt webbing runs over a bending edge of the bending and clamping element. If the force in the belt webbing exceeds a predetermined value, the clamping element swivels around its axis and clamps the belt webbing with a clamping edge against a clamping cheek of the tongue main body. The clamping element has a shaft which having a rotation axis and which is supported in the tongue main body. The rotation axis passes through the shaft.

It is basically very important that occupant restraint systems in a motor vehicle react quickly if accidents occur. It is also desirable to form the belt tongue so as to be as light as possible, in order that the necessary retractor forces for the belt webbing retraction do not have to be increased.

SUMMARY OF THE INVENTION

The present invention therefore sets itself the task of improving the belt tongue of seat belt system in such a way that it shows an improved reaction behaviour.

According to the invention, the clamping element is not supported at the tongue main body by means of a shaft, but by means of its outside surface. The tongue main body forms a corresponding sliding surface for this purpose. The clamping element in this way has the following advantages. As the rotation axis can lie outside the clamping element, this does not require a solid shaft, by means of which the clamping element is supported at the tongue main body. This means that the clamping element can be formed with a relatively low mass and relatively low moment of inertia. Furthermore, it is easily possible to provide for only a very small travel path for the clamping element, which further improves the reaction time of the system. Finally, the clamping element can be supported over a large surface on the tongue main body, so that the clamping element only requires a low level of inherent stability, which also has an additional positive effect on its mass.

Preferably, the tongue main body and the clamping element are connected with each other by means of a fixing device, which maintains the clamping elements in its normal operational state until a force above a defined level is exerted on the seat belt webbing.

Further preferred embodiments of the invention result from the further subclaims as well as from the embodiment described below with reference to the figures, which show:

BRIEF DESCRIPTION OF THE DRAWINGS

FIG. 2*b* is a cross-sectional view through FIG. 2*a* along section A-A, FIG. 3*b* is a cross-sectional view along Plane A-A from FIG. 3*a*.

DETAILED DESCRIPTION OF THE INVENTION

Figure 1:
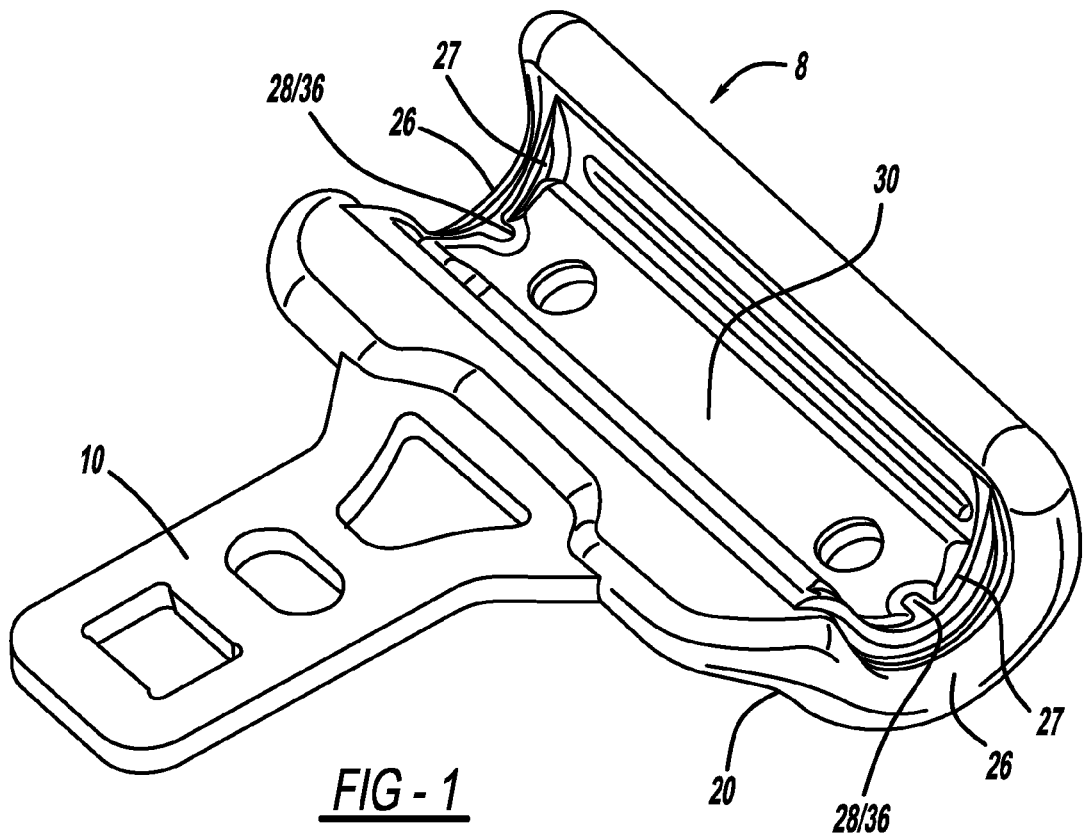
FIG. 1 is a three-dimensional representation of a belt tongue.
Figure 2A:
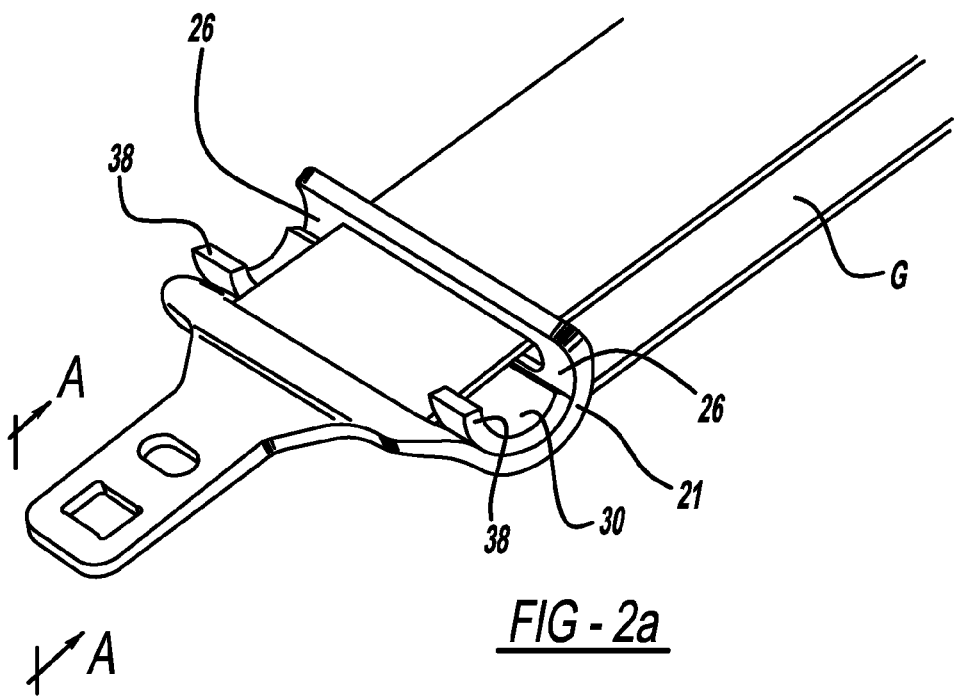
FIG. 2*a* shows the belt tongue from FIG. 1 without a plastic cover and with the front sides cut open, with a belt webbing inserted, in non-blocked or normal state.

FIGS. 1, 2*a* and 2*b* show a belt tongue 8 in normal state, i.e. without loading. The belt tongue 8 includes a connecting plate 10, which is intended to be inserted into a conventional buckle. Connected to connecting plate 10 is the tongue main body 20, which consists of a metal core 21 (see for example FIG. 2*a*), and a plastic injection-moulded overlay, which partially surrounds the metal core. The metal core 21 of tongue main body 20 and connecting plate 10 are preferably formed as a one-piece metal part. Tongue main body 20 basically has the shape of a longitudinally cut-open hollow cylinder, i.e. the shape of a groove. This means that it forms an inner semi-cylindrical surface 20*a* with a cross-section in the shape of a partial circle. This inner surface 20*a* is broken through by upper slot 25*a*, and lower slot 25*b* (see in particular FIG. 2*b*).

The tongue main body 20 forms two side arms 26, which, as can be seen in FIGS. 2*a* and 2*b*, are connected by means of the upper bar 22, the lower bar 23 and the reinforcing bar 24. Between upper bar 22 and reinforcing bar 24 is the upper slot 25*a*, between reinforcing bar 24 and lower bar 23 is the lower slot 25*b*. Belt webbing G is guided through these two slots 25*a* and 25*b*.

The clamping element 30 is positioned to fit closely with and conform with the inner surface 20*a* of the tongue main body 20 and has outer surface 30*a* which is in the form of a semi-cylinder, with its longitudinal axis 40 in the hollow area within belt tongue 8, which serves as a sliding surface. Clamping element 30 does not lie on axis 40, but rotated about it, as explained in more detail below. The clamping element 30 is also formed as a groove and the radius of its concave outer surface 30*a* corresponds to the radius of the inner surface 20*a* of the tongue main body 20. This can be seen particularly well in FIGS. 2*a* and 2*b*. Clamping element 30 is secured axially by guiding bars 27 positioned on side arms 26. The clamping element outer surface breaking nose 28 extends from each of these guiding bars 27 towards the inside and projects into a corresponding recess 36 in the clamping element 30. Breaking noses 28 form a fixing device to maintain clamping element 30 in its normal position.

In the normal state shown in FIG. 1 and FIGS. 2*a* and 2*b*, belt webbing G extends through upper slot 25*a* and is redirected by means of the bending edge 32 of clamping element 30. In this normal position, belt webbing G can be moved freely as in a normal belt tongue. At the side, belt webbing G is guided by guide legs 38 of the clamping element 30.

Figure 3A:
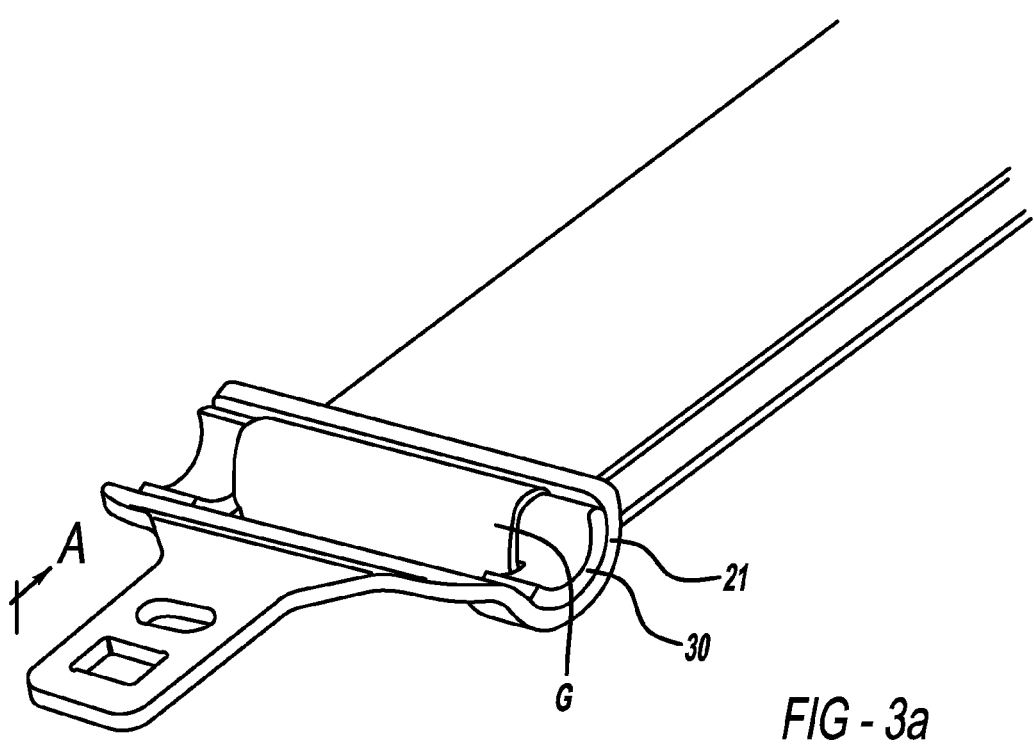
FIG. 3*a* shows the items in FIG. 2*a* in blocked state.

If a defined threshold tension force, which the belt webbing G exerts on the bending edge 32 (this is generally of a magnitude of between 10 and 20 kN), is exceeded, breaking noses 28 break and belt webbing G presses clamping element 30 into the blocking position shown in FIGS. 3a and 3b, whereby it slides over inner surface 20a of the tongue main body, in particular the reinforcing bar 24. In this blocking position, the belt webbing G is clamped two-dimensionally between clamping element 30 and upper bar 22, whereby the clamping edge 34 of the clamping element 30 and the edge of the upper bar 22 formed as clamping cheeks 22a form the clamping edges. The greater the force exerted on the belt webbing G, the greater is also the clamping force, so that the aim of decoupling between the lap belt and shoulder belt sections of belt webbing G is achieved. Thus, when the components reach the blocking positions shown in FIGS. 3a and 3b, the webbing G is pinched and the belt tongue 8 no longer freely slides along the webbing G.

It can be seen that because of the design, clamping element 30 can be formed so as to be very light, and only a short movement path is needed, which means that the desired short reaction times can be achieved. A further benefit is given by the fact that the belt tongue 8 is easy to manufacture: in particular, it is possible to lay the clamping element 30 into the metal core 21 and then to injection mold around this element, forming the breaking noses 28 at the same time. As an alternative, it is possible to firstly mold around the metal core 21 and then to lay in the clamping element 30. The breaking noses 28 may then be created by local heating of the corresponding areas of the guiding bars, whereby a certain amount of material is melted and runs into the respective recess. Both processes can particularly be performed with a high level of automation.

While the above description constitutes the preferred embodiment of the present invention, it will be appreciated that the invention is susceptible to modification, variation and change without departing from the proper scope and fair meaning of the accompanying claims.

The invention claimed is:

1. A belt tongue for a safety belt system having belt webbing passing through the belt tongue and the belt tongue adapted for connection with a buckle, the belt tongue comprising a connecting plate for connecting the belt tongue to the buckle, a tongue main body being connected to the belt tongue and the main body forming a semi-cylindrical inner surface, and a clamping element with a bending edge, the clamping element forming a semi-cylindrical outer surface and being mounted on the tongue main body with the outer surface supported by the inner surface in a way that the clamping element may rotate in relation to the tongue main body from a normal position if the force on the belt webbing exceeds a defined force to a blocking position in which the webbing is clamped between the main body and the clamping element, wherein the belt tongue provides at least one fixing device which blocks the clamping element at the tongue main body to maintain the clamping element in the normal position until the force on the webbing exceeds the defined force.

2. A belt tongue according to claim 1, wherein the clamping element outer surface defines a rotation axis which lies outside the clamping element.

3. A belt tongue according to claim 2, wherein the tongue main body forms two side arms.

4. A belt tongue according to claim 3, wherein each of the side arms having a guiding bar positioning the clamping element in the axial direction relative to the rotation axis.

5. A belt tongue according to claim 3, further comprising a reinforcing bar that extends between the side arms, wherein the clamping element is in contact with the reinforcing bar.

6. A belt tongue according to claim 3, wherein the fixing device is adjacent the side arms.

7. A belt tongue according to claim 6, wherein the fixing device comprises breaking noses at the side arms extending axially into recesses of the clamping element.

8. A belt tongue according to claim 1, wherein the tongue main body forming an upper slot and a lower slot through which the webbing passes, wherein in the normal position the webbing passing through the lower slot and wrapping over the bending edge, and wherein when the belt webbing exceeds the defined force, the clamping element is rotated to the blocking position such that the webbing forces the clamping element to rotate relative to the tongue main body, wherein the webbing is clamped by the clamping edge and a clamping cheek forming the upper edge.

9. A belt tongue according to claim 1, wherein the defined force is between about 10 and 20 kN.

* * * * *